April 20, 1948.   N. J. BROWN   2,440,039
RETICULATELY PUCKERED LAMINATED PLASTIC SHEET
Filed Aug. 2, 1943
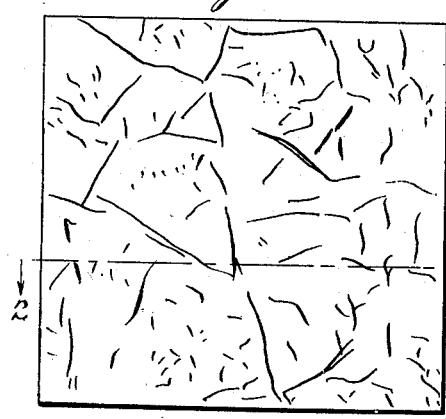
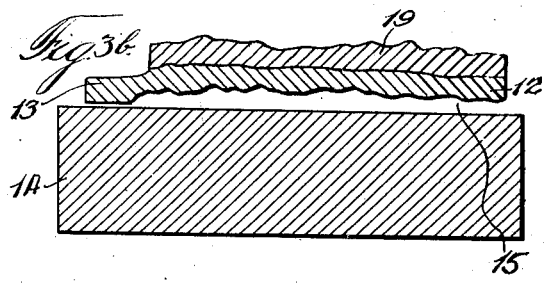
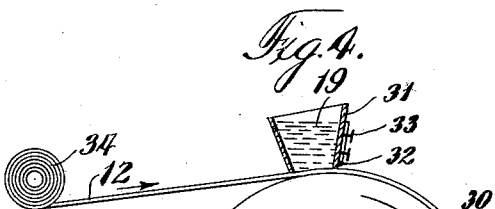
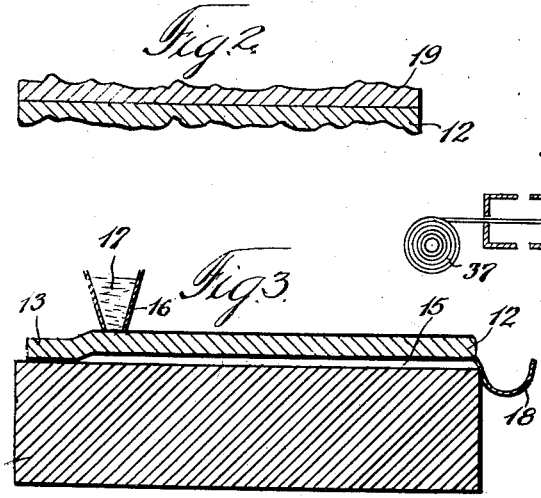
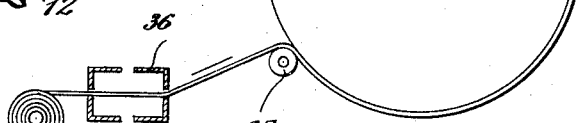
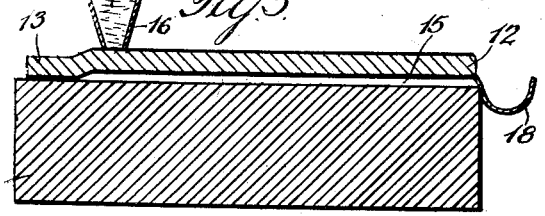
Inventor:
Nathan J. Brown.

Patented Apr. 20, 1948

2,440,039

UNITED STATES PATENT OFFICE 2,440,039

RETICULATELY PUCKERED LAMINATED PLASTIC SHEET

Nathan J. Brown, Barrington, Ill.

Application August 2, 1943, Serial No. 497,040

6 Claims. (Cl. 117—145)

The present invention relates to thin, flexible, tough sheets or films consisting of at least two mutually adhering layers, one of which comprises a cellulose compound and the other a tough, pliable vinyl resin or compound.

An object of the invention is to produce a sheet consisting of a film or layer of a cellulose compound with a thereto adhering film or layer of a vinyl resin, but produced under such circumstances that, by the use of mutual solvents, sufficient solvation of the cellulose compound film will be effected so as to produce, as a result of the shrinkage of the vinyl resin layer, a reticulate puckering of the combined films, whereby said puckering will produce a highly ornamental design which will be in heavy bas-relief on the vinyl resin side and in deep intaglio on the cellulose ester side. If translucency rather than transparency is desired, one or both of said sides may be provided with the aforementioned mat or roughened surface, which in that case will render the combined film translucent in the unpuckered areas but practically clear in the puckered areas, thereby still further emphasizing the beauty of the design.

The present invention is broadly based on the principle of mutual incompatability of solutions of vinyl resins with solutions of the cellulose compounds, and for a better understanding of the invention there are filed herewith, in connection with the present specification, a number of sheets of drawings.

In the drawings,

Fig. 1 is a plan view of the general appearance of the reticulately puckered material, while Fig. 2 is, on a greatly enlarged scale, a cross section through Fig. 1, in which it has been attempted to show, so far as the limitations of draftsmanship will permit, the corresponding bas-relief and intaglio features of the reticulately puckered film;

Figs. 3, 3—a and 3—b show three stages of a simple exemplificative method for the production of the reticulately puckered film;

Fig. 4 illustrates a method for the continuous production of the reticulately puckered film, this being purely diagrammatic and for purposes of a better understanding of the general principles of the process, but is not to be taken as a limitation on the process or product.

The present applicant has already produced, prior to his present invention, nonlaminated thin sheets or films of a cellulose compound, one side of which is provided with a mat or roughened surface of approximately the nature of ground glass, so that it may be written upon with a pencil or ink, the other side of the film being smooth. This material has found very wide application in place of tracing paper, being particularly valuable because of its entire resistance to water. Such a cellulose compound film—for example, cellulose acetate or cellulose butyrate—suffers, however, from the defect that it is rather brittle and easily torn. While this can be remedied somewhat by large amounts of high boilers and plasticizers, yet if such a film is excessively plasticized it will have a tendency to be flexible in the sense that it will permit distortion, which of course is inimical to its use as a tracing cloth.

Applicant therefore was faced with the problem of trying to produce a tough, pliable film suitable for use as a tracing cloth. He attempted to solve this problem by using, in lieu of the cellulose ester, the well-known vinyl compounds, vinyl esters and vinyl resins, which however are too extensible, somewhat like rubber, and therefore would permit too great distortion of the drawing after it once had been made. He therefore sought to combine the principles of permanence of dimensions of the cellulose compound film with the pliability, toughness and tear resistance of the vinyl resin film, seeking to accomplish this by superimposing one film upon the other; but in so doing he made the surprising and entirely unexpected discovery that when a solution of a vinyl resin is applied to a preformed, dry and loosely supported sheet of cellulose compound, the solvent employed for making the vinyl resin solution will attack the cellulose ester or compound, the solvate thus formed however being incompatible with the vinyl resin, with the result that thereby the cellulose compound sheet is very heavily reticulately puckered or wrinkled. After drying such a laminated sheet, the reticulations appear as very handsome designs which are in strong bas-relief on the vinyl resin side and in corresponding heavy intaglio on the cellulose ester side. The strikingly handsome appearance of this material is incapable of illustration within the limits of the draftsman's art, such as by using India ink, and therefore Fig. 1 can give only a very inadequate illustration.

This puckering effect is probably due to the partial solvation of the cellulose acetate together with its therein contained plasticizer, which by intermingling with the vinyl resin solution causes changes in the surface tension and in the internal energy of the mixed solution, so that, on drying, stresses are exerted upon the sheets which cause the development of the ridges, thereby placing the areas defined by the ridges under heavier tension, so that less reticulation or wrinkling takes place therebetween, leaving the finer lines and rounded puckered areas. At first it would appear that such reticulation would be highly undesirable, but the intrinsic beauty of the material makes it valuable from a commercial point of view, lending itself to the manufacture of outer garments such as raincoats, translucent umbrellas, book coverings, wrapping materials, and the like. By a suitable choice of colors, an almost unlimited series of different effects are obtainable.

As an exemplification of the present invention, but without in any way intending thereby to limit the invention, examples of the manufacture of the various types of sheets will now be given.

*Reticulately puckered sheets.*—For this example, reference is directed to Figs. 1, 2, 3, 3—*a*, and 3—*b*, Figs. 1 and 2 having already been described hereinabove. There is first produced, by the usual casting method, a thin film of, let us say, cellulose acetate or butyrate, which may be made from a lacquer or solution having the following composition:

| | Parts by weight |
|---|---|
| Cellulose acetate | 1 |
| Commercial acetone | 3¾ |
| Plasticizer | ¼ |

This plasticizer may consist of any of the well-known plasticizers for cellulose acetate, such as Lindol, Monsanto M–17, dibutyl phthalate, and the like. In the case of butyrate, the following formula may be used:

| | Parts by weight |
|---|---|
| Cellulose butyrate | 1 |
| Commercial acetone | 4 |
| Plasticizer (e. g., dibutyl phthalate) | ¼ |

Sheets may be cast on a continuous casting wheel and then dried in the usual manner, as used in the production of cellulose ester wrapping sheets, so that they are substantially as dry as they are usually sold in commerce. A sheet of such cellulose compound, designated in Fig. 3 by the reference numeral 12, is secured attached at one end 13 to a suitable supporting surface, such as a sheet of glass or metal, 14, the rest of it however merely resting upon the support. This nonadherence is indicated in Figs. 3, 3—*a* and 3—*b* by the exaggerated space 15, by which it is intended to show that the sheet is adhering at the end 13 but is not adhering at any other point to the support 14. By means of a suitable hopper 16, a solution or dope 17 of a vinyl resin is applied to the sheet 12 by the expedient of rapidly moving this hopper to the right until the hopper 16 reaches the extreme end of the sheet 12, where any excess solution of vinyl resin may fall into the trough 18, thus leaving a film 19 of the vinyl resin superimposed upon that area of the cellulose compound sheet 12 which has been traversed by the hopper. This sheet is shown in greatly exaggerated size in Figs. 3—*a* and 3—*b*. Fig. 3—*a* shows the appearance immediately after application, while Fig. 3—*b* shows the appearance after drying. It will be noticed that after drying the sheet has substantially the same appearance as that shown in Fig. 2, having the reticulate portions in bas-relief on the vinyl resin side 19 and in intaglio on the cellulose ester side 12. After drying, the sheet is detached from the support to which it was clinging at the point 13. The sheet is then hung up to eliminate all of the volatile solvents, so that it may eventually be rolled up or otherwise packed for shipment. It may be advisable to dust the vinyl resin side with talc or finely ground mica to prevent undue adhesion in case of hot weather. The part which consists only of the cellulose ester may be trimmed off. A vinyl resin dope suitable for this purpose may have the following composition:

| | Parts by weight |
|---|---|
| Vinyl resin (such as Carbide & Carbon Chemicals Corporation's vinyl resin VYNW | 1 |
| Methyl ketone | 4 |
| Dibutyl phthalate | ¼ |

As an indication of how the present invention can be carried out by a continuous process, there is illustrated in Fig. 4 at least one way of making the reticulately puckered material. Referring to said figure, therefore, there is provided a wheel 30 which revolves slowly in the direction of the arrow. There is also provided a hopper 31 provided with a doctor blade 32 capable of accurate adjustment relative to the wheel 30 by means of diagrammatically illustrated adjusting screws 33. A supply of cellulose ester film 12, which may come from a supply roll 34, is fed so as to come into close contact with the peripheral surface of the wheel 30 so as to pass between the hopper 31 and the wheel 30, the said hopper containing the vinyl ester dope 19. Obviously, under these conditions, the continuous film of vinyl solution will be deposited on top of the film 12. As the wheel rotates, the puckering will take place, the solvents will be substantially removed, and the combined film can then be stripped from the wheel 30 by passing over the roller 35, from whence the material will pass through the drier 36, which is purely diagrammatically indicated, the combined material finally being rolled upon the roller 37. Means for dusting the vinyl resin side may, of course, be provided but need not be illustrated, as any suitable means for accomplishing this may be employed.

Summing up the invention, therefore, it teaches the successful production of a laminated film, one part of which consists of a cellulose ester and the other part of which consists of a film or layer of vinyl resin, the invention also teaching how to combine the two under such conditions so as to obtain a material which has a reticulately puckered appearance.

I claim:

1. A reticulately macroscopically puckered laminated sheet comprising a layer or film of a cellulose ester and a thereto adhering layer of a pliable tough vinyl resin, the puckering being in bas-relief on the vinyl resin side and intaglio on the cellulose ester side.

2. A reticulately macroscopically puckered laminated sheet comprising a layer or film of a cellulose acetate and a thereto adhering layer of a pliable tough vinyl resin, the puckering being in bas-relief on the vinyl resin side and intaglio on the cellulose acetate side.

3. A recticulately macroscopically puckered laminated sheet comprising a layer or film of a cellulose butyrate and a thereto adhering layer of a pliable tough vinyl resin, the puckering being in bas-relief on the vinyl resin side and intaglio on the cellulose butyrate side.

4. Process of producing a reticulately macroscopically puckered sheet comprising applying a solution of a vinyl resin to a preformed dry loosely supported sheet or film of a cellulose compound, employing as the solvent for the vinyl resin a solvent also capable of dissolving the cellulose compound, and drying the laminated structure thus obtained, whereby the partial solvation of the cellulose compound by said solvent produces a reticulate pucker in the sheet, the pucker being in bas-relief on the vinyl resin side and intaglio on the cellulose compound side.

5. Process of producing a recticulately macroscopically puckered sheet comprising applying a solution of a vinyl resin to a preformed dry loosely supported sheet or film of a cellulose ester, employing as the solvent for the vinyl resin a solvent also capable of dissolving the cellulose ester, and drying the laminated structure thus obtained, whereby the partial solvation of the cellulose ester by said solvent produces a reticulate pucker in the sheet, the pucker being in bas-relief on the vinyl resin side and intaglio on the cellulose ester side.

6. Process of producing a reticulately macroscopically puckered sheet comprising applying a solution of a vinyl resin to a preformed dry loosely supported sheet or film of a cellulose acetate compound, employing as the solvent for the vinyl resin a solvent also capable of dissolving the cellulose acetate compound, and drying the laminated structure thus obtained, whereby the partial solvation of the cellulose acetate compound by said solvent produces a recticulate pucker in the sheet, the pucker being in bas-relief on the vinyl resin side and intaglio on the cellulose acetate compound side.

NATHAN J. BROWN.

REFERENCES CITED

The following references are of record in the file of this patent:

UNITED STATES PATENTS

| Number | Name | Date |
| --- | --- | --- |
| 1,627,935 | Stinchfield | May 10, 1927 |
| 1,960,632 | Jackman | May 29, 1934 |
| 2,028,776 | Hibbert | Jan. 28, 1936 |
| 2,075,106 | Fordyce et al. | Mar. 30, 1937 |
| 2,101,876 | Scott | Dec. 14, 1937 |
| 2,304,632 | Faelton | Dec. 8, 1942 |
| 2,320,473 | Rooney et al. | June 1, 1943 |

FOREIGN PATENTS

| Number | Country | Date |
| --- | --- | --- |
| 100,801 | Australia | Apr. 29, 1937 |